United States Patent [19]
Sangret

[11] Patent Number: 5,649,467
[45] Date of Patent: Jul. 22, 1997

[54] POWER STEERING CONTROL VALVE

[75] Inventor: Henry C. Sangret, St. Clair Shores, Mich.

[73] Assignee: TRW Inc., Lyndhurst, Ohio

[21] Appl. No.: 608,141

[22] Filed: Feb. 28, 1996

[51] Int. Cl.⁶ .................................................. F15B 9/10
[52] U.S. Cl. ..................................................... 91/375 A
[58] Field of Search ........................................ 91/375 H

[56] References Cited

U.S. PATENT DOCUMENTS

| | | |
|---|---|---|
| 4,322,062 | 3/1982 | Aleck ........................... 267/154 |
| 4,346,205 | 8/1982 | Hiles . |
| 4,481,866 | 11/1984 | Matouka . |
| 4,808,469 | 2/1989 | Hiles . |
| 5,287,792 | 2/1994 | Betros et al. .................. 91/375 R |

FOREIGN PATENT DOCUMENTS

| | | | |
|---|---|---|---|
| 621168 | 10/1994 | European Pat. Off. ............. | 91/375 A |

OTHER PUBLICATIONS

Publication entitled "Sorbothane-the Ultimate Damping & Isolation Material".

*Primary Examiner*—F. Daniel Lopez
*Attorney, Agent, or Firm*—Tarolli, Sundheim, Covell, Tummino & Szabo

[57] ABSTRACT

A power steering control valve (10) includes inner and outer valve members (30 and 32) which are rotatable relative to each other to control fluid flow to and from a power steering motor. A spring assembly (50) interconnects the inner and outer valve members (30 and 32). The spring assembly (50) includes a torsion bar (64) and a body (66) of viscoelastic material. A housing (68) encloses the body (66) of viscoelastic material and a portion of the torsion bar. The body (66) of viscoelastic material is bonded to an inner side surface (88) of the housing (68) and to an outer side surface (82) of the torsion bar (64). The body (66) of viscoelastic material damps vibratory movement between the inner and outer valve members (30 and 32).

8 Claims, 3 Drawing Sheets

POWER STEERING CONTROL VALVE

BACKGROUND OF THE INVENTION

The present invention relates to a valve which controls the operation of a power steering motor.

Known power steering control valves include inner and outer valve members which are rotated relative to each other to control operation of a power steering motor. During operation of the valve, there may be a slight vibratory and/or oscillatory movement between the inner and outer valve members. These small movements between the inner and outer valve members may result in a corresponding reaction from the power steering motor and a slight shuttering effect which may be detected by a driver of a vehicle.

SUMMARY OF THE INVENTION

The present invention provides a new and improved apparatus for use in a vehicle to control operation of a power steering motor. The apparatus includes inner and outer valve members which are rotatable relative to each other to control fluid flow to and from the power steering motor. A spring assembly interconnects the inner and outer valve members.

The spring assembly includes a torsion bar and a body of viscoelastic material. The body of viscoelastic material may be enclosed by a housing. The housing may have one end fixedly connected with an end portion of the torsion bar. In one specific embodiment of the invention, the body of viscoelastic material is connected to an outer side surface of a main section of the torsion bar and to an inner side surface of the housing.

When the body of viscoelastic material is subjected to vibratory forces, the viscoelastic material has a relatively high resistance to deformation and damps the vibratory forces. When the body of viscoelastic material is subjected to relatively long duration steering control forces to effect relative rotation between the inner and outer valve members, the viscoelastic material has a relatively low resistance to deformation.

BRIEF DESCRIPTION OF THE DRAWINGS

The foregoing and other features of the present invention will become more apparent to one skilled in the art to which the present invention relates upon consideration of the following description of the invention with reference to the accompanying drawings, wherein.

DESCRIPTION OF ONE SPECIFIC PREFERRED EMBODIMENT OF THE INVENTION

General Description

A power steering control valve 10 (FIG. 1) is used in a vehicle to control operation of a power steering motor (not shown) which is operable to turn steerable vehicle wheels. The power steering control valve 10 includes a housing 12. The housing 12 is connected with an engine driven power steering pump (not shown) through an inlet port 14. Power steering fluid from the pump flows to the inlet port 14 in the manner indicated schematically by the arrow 16 in FIG. 1.

Figure 1:
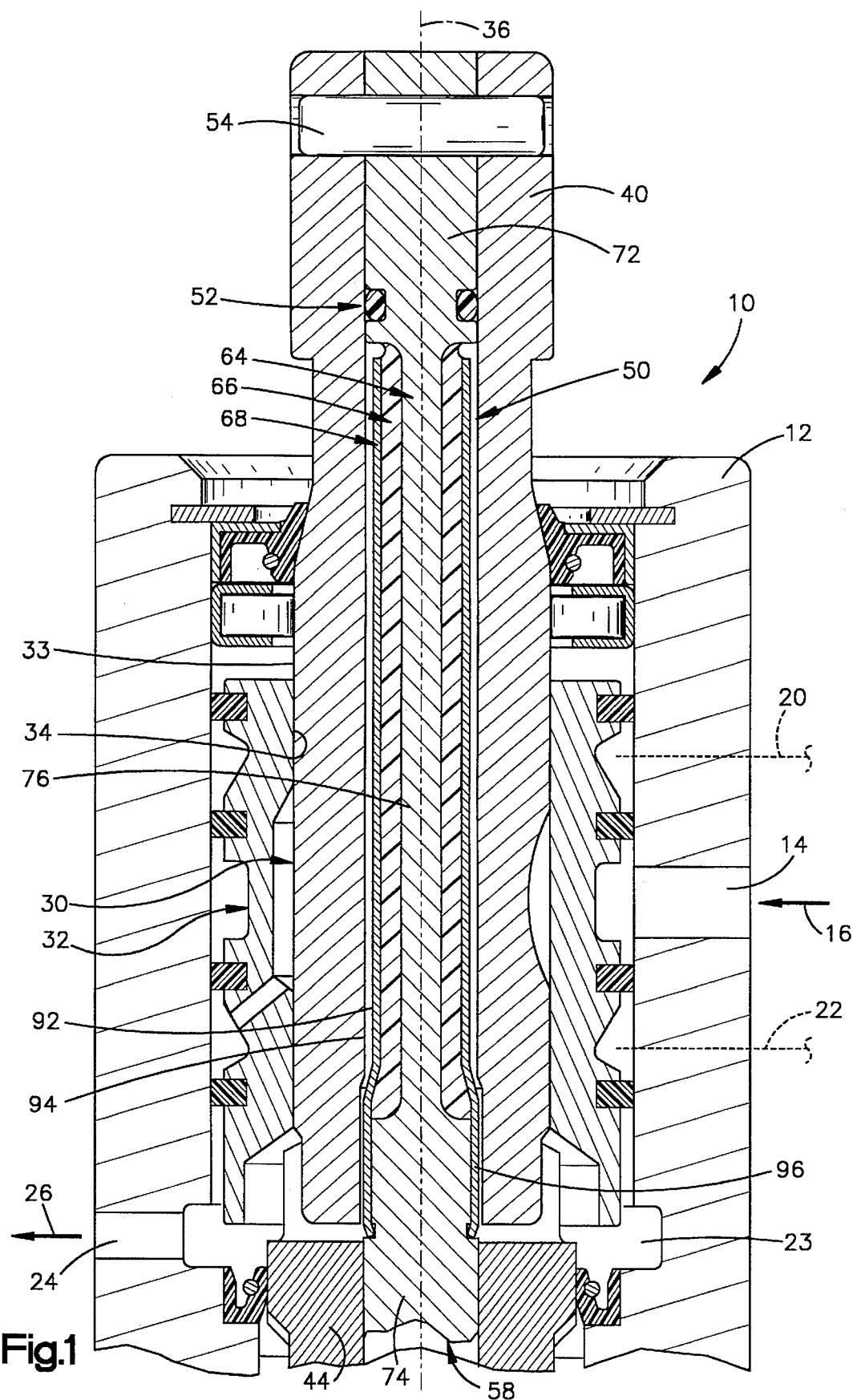
FIG. 1 is a fragmentary sectional view of a power steering valve constructed in accordance with the present invention.

The housing 12 is connected with a power steering motor (not shown) through motor conduits, indicated schematically at 20 and 22 in FIG. 1. Fluid from the power steering motor and/or inlet port 14 is conducted to a return chamber 23 in the housing 12. Fluid is conducted from the return chamber 23 through an outlet port 24 to a reservoir for the power steering pump, in the manner indicated schematically by the arrow 26 in FIG. 1.

The power steering control valve 10 includes an inner valve member 30 and an outer valve member 32. The outer valve member 32 is a cylindrical sleeve which encloses the generally cylindrical inner valve member 30. The inner valve member 30 has a cylindrical outer side surface 33 which is engaged by a cylindrical inner side surface 34 on the outer valve member 32. The inner valve member 30 and outer valve member 32 are rotatable relative to each other and to the housing 12 about a common central axis 36.

The generally cylindrical inner valve member 30 is formed as one piece with a cylindrical valve stem 40. The valve stem 40 is connected with a steering wheel of a vehicle. The one piece outer valve member 32 is disposed in a coaxial relationship with the inner valve member 30.

The outer valve member 32 is connected with a follow-up member 44. The follow-up member 44 is rotatably supported in the housing 12 and is connected with a pinion gear (not shown) which is disposed in meshing engagement with a rack (not shown). The rack is connected with the power steering motor and steerable vehicle wheels.

The power steering control valve 10 is of the open center type. Therefore, when the power steering control valve 10 is in an initial or unactuated condition, fluid pressure from the power steering pump is conducted into the housing 12 through the inlet port 14. The fluid pressure is conducted through the motor conduits 20 and 22 to cylinder chambers in the piston and cylinder type steering motor. Fluid flow is conducted from the return chamber 23 in the housing 12 to the outlet port 24 back to the reservoir for the pump.

Upon actuation of the power steering control valve 10, the pressure in one of the chambers of the power steering motor is increased while the pressure in the other chamber is decreased. This effects operation of the power steering motor to turn the steerable vehicle wheels.

For example, rotation of the inner valve member 30 in one direction relative to the outer valve member 32 will reduce the extent of communication of the motor conduit 20 with the outlet port 24 and increase the extent of communication of the motor conduit 20 with the inlet port 40. This results in high pressure fluid from the power steering pump being conducted to a motor cylinder chamber through the conduit 20. This high pressure fluid moves a piston in the power steering motor. As the piston in the power steering motor moves, fluid is discharged from the opposite chamber of the power steering motor and is conducted through the motor conduit 22 to the return chamber 23 in the housing 12. The fluid is conducted, at a relatively low pressure, from the return chamber 23 through the outlet port 24 to the reservoir for the power steering pump.

The inner and outer valve members 30 and 32 are interconnected by an improved spring assembly 50. An upper (as viewed in FIG. 1) end portion 52 of the spring assembly 50 is connected with the valve stem portion 40 of the inner valve member 30. A cylindrical pin 54 extends through the upper end portion 52 of the spring assembly 50 and the stem portion 40 of the inner valve member 30 to interconnect the spring assembly 50 and inner valve member 30.

A lower (as viewed in FIG. 1) end portion 58 of the spring assembly 52 is connected with the outer valve member 32 through the follow-up member 44. Suitable lugs on the follow-up member 44 engage recesses in the outer valve member 32 to interconnect the outer valve member and the follow-up member. The lower end portion 58 of the spring assembly 52 is fixedly secured to the follow-up member 44. The spring assembly 50 is resiliently deflectable to enable relative rotation to occur between the inner and outer valve members 30 and 32.

The inner and outer valve members 30 and 32 have a known construction and cooperate with each other in the same manner as is disclosed in U.S. Pat. Nos. 4,276,812; 5,230,273; and 5,361,861. The inner and outer valve members 30 and 32 cooperate with the power steering pump and motor in the same general manner as is disclosed in U.S. Pat. Nos. 3,709,099 and 4,942,803. It is contemplated that the inner and outer valve members 30 and 32 may have any one of many different known constructions and may cooperate with each other to control the operation of any one of many different known types of power steering motors.

Spring Assembly

In accordance with a feature of the present invention, the spring assembly 50 is effective to damp vibratory and/or oscillatory relative movement between the inner and outer valve members 30 and 32. Thus, upon actuation of the power steering control valve 10, the spring assembly 50 cooperates with the inner and outer valve members 30 and 32 to minimize any tendency for vibratory and/or oscillatory movement to occur between the inner and outer valve members. The damping provided by the spring assembly 50 is effective to eliminate or at least minimize instabilities which may tend to occur upon actuation of the power steering control valve 10.

Figure 2:
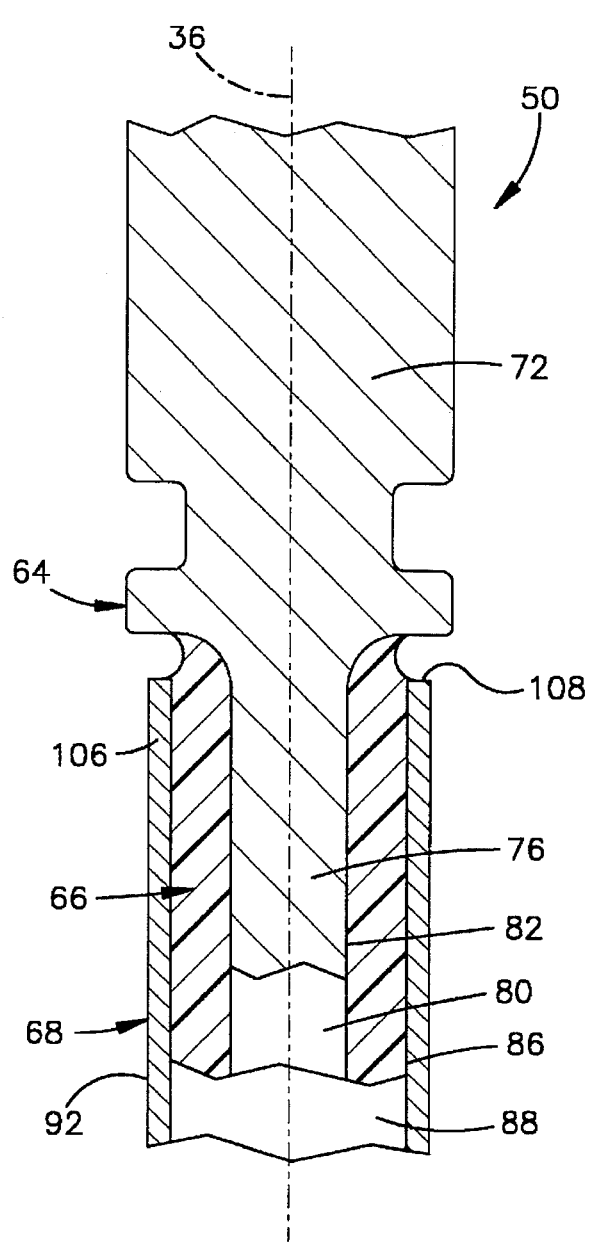
FIG. 2 is an enlarged fragmentary view of one end portion of a spring assembly which interconnects inner and outer valve members in the steering control valve of FIG. 1.
Figure 3:
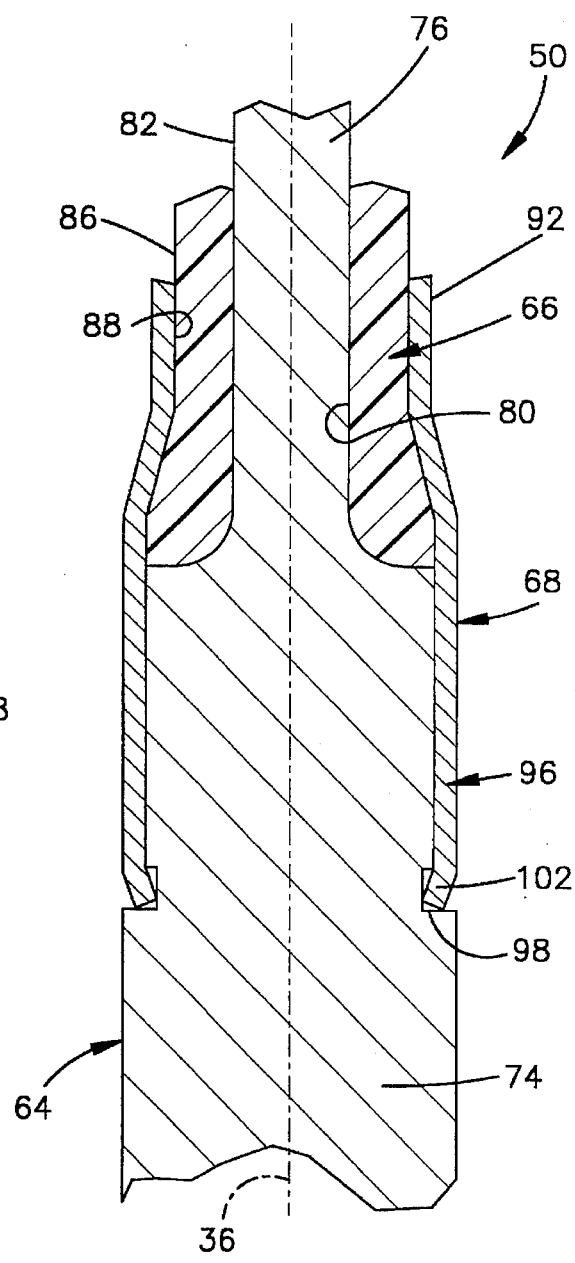
FIG. 3 is an enlarged fragmentary view of another end portion of the spring assembly which interconnects the inner and outer valve members.

The improved spring assembly 50 includes a metal torsion bar 64, a body 66 of viscoelastic material, and a housing 68. The torsion bar 64 has a cylindrical upper end portion 72 (FIGS. 1 and 2), a cylindrical lower end portion 74 (FIGS. 1 and 3), and a cylindrical main or central section 76 (FIGS. 1-3). The cylindrical upper and lower end portions 72 and 74 and main section 76 of the torsion bar 64 have a common central axis 36. The upper and lower end portions 72 and 74 and main section 76 of the torsion bar 64 are integrally formed as one piece of metal.

The upper end portion 72 of the torsion bar 64 is fixedly connected with the stem portion 40 of the inner valve member 30. The lower end portion 74 of the torsion bar 64 is fixedly connected to the outer valve member 32 through the follow-up member 44. The main section 76 of the torsion bar 64 has a cylindrical configuration and has a smaller diameter than the upper and lower end portions 72 and 74 of the torsion bar 64. Therefore, upon the application of torque to the upper and lower end portions 72 and 74 of the torsion bar 64, the main section 76 of the torsion bar 64 is resiliently twisted in a known manner.

When a vehicle steering wheel (not shown) is turned in one direction, for example, a counterclockwise direction, the valve stem 40 and upper end portion 72 of the torsion bar 64 are rotated together relative to the outer valve member 32 and the lower end portion 74 of the torsion bar. As this occurs, the main section 76 of the torsion bar is resiliently deflected and the inner and outer valve members 30 and 32 cooperate to direct fluid flow to one of the motor conduits 20 or 22. In addition, the inner and outer valve members 30 and 32 connect the other motor conduit with the outlet port 24 to effect operation of the power steering motor in a known manner.

The body 66 (FIGS. 1-3) of viscoelastic material is connected with the torsion bar 64. The body 66 of viscoelastic material has a cylindrical tubular configuration and encloses the main section 76 of the torsion bar 64. The body 66 of viscoelastic material is connected to the main section 76 of the torsion bar 64 and the housing 68.

The body 66 of viscoelastic material has a cylindrical inner side surface 80 (FIGS. 2 and 3) which is fixedly secured (bonded) to a cylindrical outer side surface 82 of the main section 76 of the metal torsion bar 64. The body 66 of viscoelastic material has a cylindrical outer side surface 86 which is fixedly secured (bonded) to a cylindrical inner side surface 88 of the metal housing 68. The tubular cylindrical body 66 of viscoelastic material encloses the main section 76 of the torsion bar 64 and extends between the upper and lower end portions 72 and 74 of the torsion bar.

The metal housing 68 has a tubular cylindrical configuration and encloses both the body 66 of viscoelastic material and the main section 76 of the torsion bar 64. The housing 68 has a continuous cylindrical outer side surface 92 which is coaxial with and spaced from a cylindrical inner side surface 94 (FIG. 1) of the inner valve member 30. Upon resilient twisting of the main section 76 of the torsion bar 64, the inner valve member 30 is rotatable relative to the outer valve member 32 and the housing 68.

The cylindrical metal housing 68 has a lower end portion 96 (FIG. 3) which is fixedly secured to the lower end portion 74 of the torsion bar 64. Thus, a knurled annular groove 98 is formed in the lower end portion 74 of the torsion bar 64. The lower end portion 96 of the housing 68 has a radially inwardly projecting annular flange 102 which is crimped into the groove 98 in the lower end portion 74 of the torsion bar 64.

The knurling on the groove 98 cooperates with the flange 102 to hold the housing 68 against rotational movement about the central axis 36 of the torsion bar 64. Although it is preferred to retain the lower end portion 96 of the housing 68 against movement relative to the lower end portion 74 of the torsion bar 64 by crimping the housing into the knurled annular groove 98 in the torsion bar, the lower end portion of the housing and the torsion bar could be fixedly interconnected in a different manner if desired. For example, a plurality of tangs could be formed in the end portion 96 of the housing 68 and extend into correspondingly shaped recesses in the lower end portion 74 of the torsion bar 64.

The housing 68 has a cylindrical upper end portion 106 (FIG. 2). The upper end portion 106 of the housing 68 has an annular end surface 108 which is axially spaced from the upper end portion 72 of the torsion bar 64. The axial spacing between the upper end portion 106 of the housing 68 and the upper end portion 72 of the torsion bar 64 accommodates rotational movement between the upper end portion 72 of the torsion bar 64 and the lower end portion 74 (FIG. 3) of the torsion bar. Thus, upon application of torque to the upper and lower end portions 72 and 74 of the torsion bar, the main section 76 of the torsion bar is resiliently twisted. As this occurs, there is rotational movement between the end surface 108 of the housing 68 and the upper end portion 72 of the torsion bar.

The body 66 of viscoelastic material interconnects the main section 76 of the torsion bar 64 and the housing 68. The body 66 of viscoelastic material has appreciable and conjoint viscous and elastic properties. The body 66 of viscoelastic material exhibits viscous and delayed elastic response to stress in addition to instantaneous elasticity. High damping and low amplification at resonance enables the body 66 of viscoelastic material to absorb shock and vibration forces. In the illustrated embodiment of the invention, the body 66 of viscoelastic material is a thermosetting, polyether based, polyurethane material which is molded between the housing 68 and main section 76 of the torsion bar 64.

Figure 4:
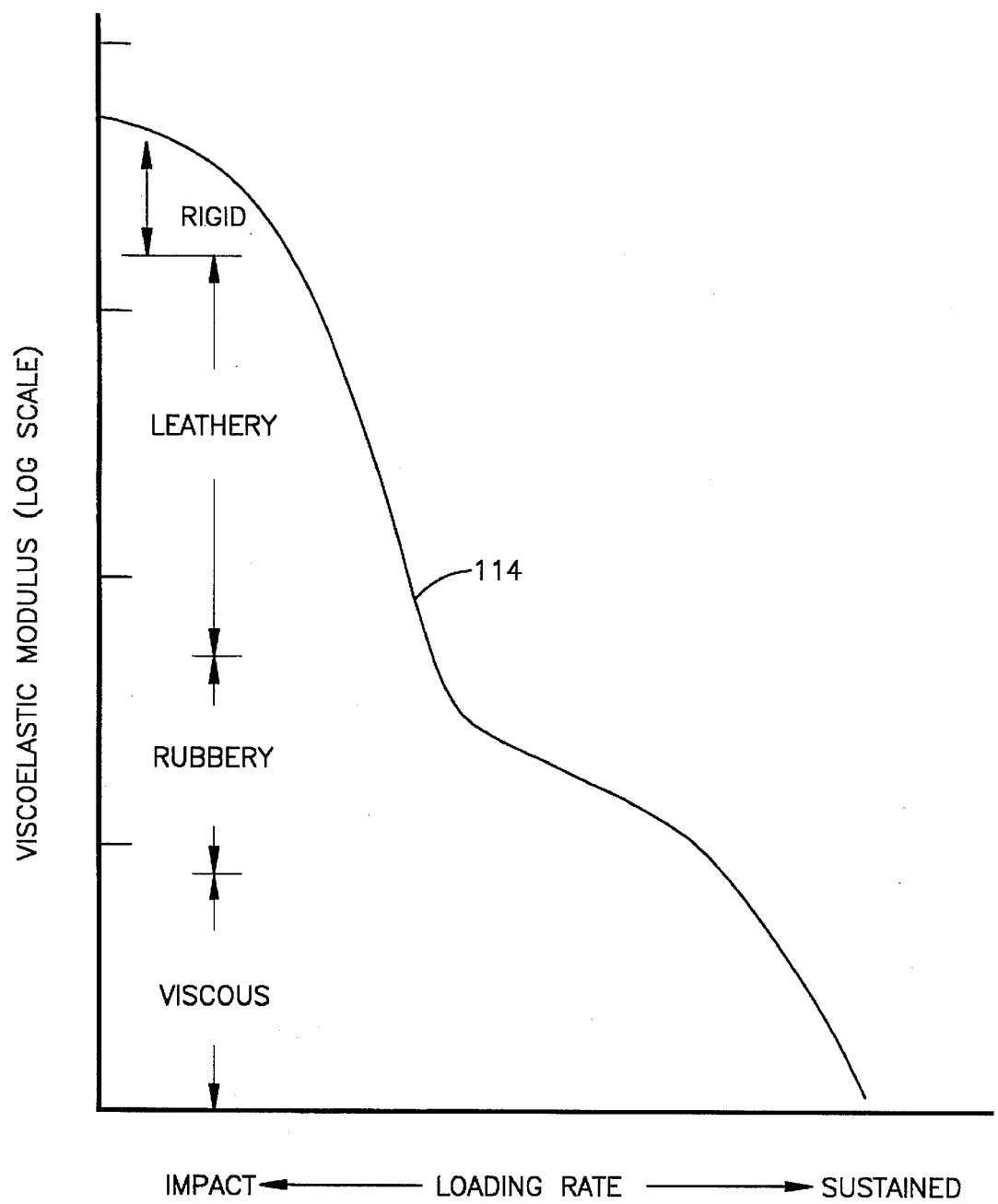
FIG. 4 is a graph illustrating the manner in which viscoelastic material responds to different load rates.

The body 66 of viscoelastic material responds to loads in the general manner indicated by the curve 114 in FIG. 4. When the body 66 of viscoelastic material is subjected to impact or extremely rapid loading, the viscoelastic modulus of the body 66 of viscoelastic material is relatively high and the material has a relatively high resistance to deformation. As the rate of loading decreases, the viscoelastic modulus of the body 66 of viscoelastic material decreases. As the viscoelastic modulus of the body 66 of viscoelastic material decreases, the resistance of the body of viscoelastic material to deformation decreases.

The rigidity of the body 66 of viscoelastic material decreases and the material becomes more elastic and then more viscous in its characteristics as the rate of loading decreases. Thus, when the body 66 of viscoelastic material is subjected to a sharp impact load, the viscoelastic modulus of the material is high and the material is rigid and opposes the impact forces (FIG. 4). However, when the rate of loading of the body 66 of viscoelastic material is decreased, the body becomes relatively elastic and then tends to be more viscous in its response to the loading.

When a load is applied to the body 66 of viscoelastic material and then removed, there is a micropause between compressive and relaxation phases of the body 66 of viscoelastic material. This delay minimizes rebound of the body 66 of viscoelastic material. The combined viscous and elastic properties of the body 66 of viscoelastic material enables it to isolate or absorb relatively high frequency vibrations.

One commercial source of the material which forms the body 66 of viscoelastic material is Sorbothane Inc. of 2144 State Route 59, Kent, Ohio. This specific viscoelastic material is a thermoset, polyether based, polyurethane material which has a hardness of between 25–80 durometer, Shore 00 scale. Generally similar viscoelastic materials are described in U.S. Pat. Nos. 4,346,205 and 4,808,469. Of course, other commercial sources could be used to obtain other viscoelastic materials for the body 66 of viscoelastic material.

Operation

When a steering operation is to be undertaken, the inner valve member 30 is rotated relative to the outer valve member 32. As this occurs, the main section 76 of the torsion bar is resiliently twisted. Since the undertaking of a steering operation and flexing of the torsion bar 64 occur at a relatively low rate, the body 66 of viscoelastic material transmits relatively little force between the torsion bar 64 and the housing 68. This results in the body 66 of viscoelastic material being substantially ineffective to resist the relative rotation between the inner and outer valve members 30 and 32.

However, if there is any tendency for relatively high frequency vibration and/or oscillations to occur between the inner and outer valve members 30 and 32, there will be a rapid loading and partial unloading of the spring assembly 50. This rapid loading and partial unloading of the spring assembly 50 is resisted by the body 66 of viscoelastic material. This is because the body 66 of viscoelastic material has a relatively high viscoelastic modulus (FIG. 4) in response to the relatively high frequency vibrations and/or oscillations.

Any tendency for vibration and/or oscillations to occur between the inner and outer valve members 30 and 32 results in a high frequency application and relaxation of force against the body 66 of elastomeric material. The short delay between the compressive and relaxation phases of the body 66 of viscoelastic material enables the body of viscoelastic material to damp the vibrations and/or oscillations.

Due to the vibration absorbing characteristics of the body 66 of viscoelastic material, any tendency for vibratory and/or oscillatory movement to occur between the inner and outer valve members 30 and 32 is eliminated or at least minimized. This results in smooth operation of the power steering control valve 10 and the power steering motor connected with the power steering control valve.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in a vehicle to control a flow of fluid to a power steering motor, said apparatus comprising:
   a housing adapted to be connected with a fluid supply conduit and the power steering motor;
   first and second valve members disposed in said housing and rotatable relative to each other to control fluid flow from the fluid supply conduit to the power steering motor; and
   a spring assembly interconnecting said first and second valve members, said spring assembly including a torsion bar, a body of viscoelastic material, and a tubular housing having a central passage through which said torsion bar extends, said tubular housing having a portion which is fixedly connected to said torsion bar, said body of viscoelastic material being at least partially disposed in said tubular housing, said body of viscoelastic material having a first surface area which is fixedly secured to said torsion bar and a second surface area which is fixedly secured to said tubular housing connected with said torsion bar.

2. An apparatus as set forth in claim 1 wherein said body of viscoelastic material has a viscoelastic modulus which decreases with decreasing rate of loading on said body of viscoelastic material to enable said body of viscoelastic material to have a greater resistance to forces of short duration than to forces of long duration.

3. An apparatus as set forth in claim 1 wherein said torsion bar has a first end portion connected with said first valve member, a second end portion connected with said second valve member and a central portion extending between said first and second end portions, said central portion of said torsion bar being enclosed by and connected to said body of viscoelastic material.

4. An apparatus as set forth in claim 1 wherein said viscoelastic material has a relatively low resistance to deformation under the influence of a sustained load and has a relatively high resistance to deformation under the influence of an impact load.

5. An apparatus as set forth in claim 1 wherein said body of viscoelastic material pauses briefly between compressive and relaxation phases of vibrational loading to damp the vibrational loading.

6. An apparatus as set forth in claim 1 wherein said body of viscoelastic material is a polyether based, polyurethane material having a hardness of between 25–80 durometer, Shore 00 scale.

7. An apparatus as set forth in claim 1 wherein said body of viscoelastic material exhibits viscous and delayed elastic response to stress.

8. An apparatus for use in a vehicle to control a flow of fluid to a power steering motor, said apparatus comprising:

a housing adapted to be connected with a fluid supply conduit and the power steering motor;

first and second valve members disposed in said housing and rotatable relative to each other to control fluid flow from the fluid supply conduit to the power steering motor; and a spring assembly interconnecting said first and second valve members, said spring assembly including a torsion bar, a body of viscoelastic material, and a longitudinally extending tubular housing which encloses at least a portion of said torsion bar, said housing having a first end portion which is fixedly connected with a portion of said torsion bar and a second end portion which is spaced from said torsion bar, said body of viscoelastic material being fixedly connected with an inner side surface of said housing and an outer side surface of said torsion bar.

* * * * *